United States Patent
Raj

(10) Patent No.: US 10,165,400 B2
(45) Date of Patent: Dec. 25, 2018

(54) METHODS AND SYSTEMS FOR SENDING LOCATION BASED ALERT MESSAGES

(71) Applicant: Unified Messaging Systems ASA, Oslo (NO)

(72) Inventor: Aneesh Raj, Bangalore (IN)

(73) Assignee: Unified Messaging Systems ASA, Oslo (NO)

(*) Notice: Subject to any disclaimer, the term of this patent is extended or adjusted under 35 U.S.C. 154(b) by 0 days.

(21) Appl. No.: 15/766,871

(22) PCT Filed: Oct. 14, 2016

(86) PCT No.: PCT/IB2016/056181
§ 371 (c)(1),
(2) Date: Apr. 9, 2018

(87) PCT Pub. No.: WO2017/064671
PCT Pub. Date: Apr. 20, 2017

(65) Prior Publication Data
US 2018/0302744 A1    Oct. 18, 2018

(30) Foreign Application Priority Data
Oct. 14, 2015 (IN) .......................... 3315/DEL/2015

(51) Int. Cl.
*H04M 11/04* (2006.01)
*H04W 4/021* (2018.01)
(Continued)

(52) U.S. Cl.
CPC .............. *H04W 4/021* (2013.01); *H04W 4/06* (2013.01); *H04W 4/12* (2013.01); *H04W 4/90* (2018.02); *H04H 20/59* (2013.01); *H04H 60/52* (2013.01)

(58) Field of Classification Search
None
See application file for complete search history.

(56) References Cited

U.S. PATENT DOCUMENTS 8,200,239 B2   6/2012  Mia et al.
8,306,503 B2  11/2012  Morrison
(Continued)

FOREIGN PATENT DOCUMENTS

EP    2093909 A1      8/2009
WO   WO-2007147142 A2  12/2007
(Continued)

OTHER PUBLICATIONS

Cuevas Casado, A., "International Search Report," prepared for PCT/IB2016/056181, dated Jan. 17, 2017, four pages.

*Primary Examiner* — Suhail Khan
(74) *Attorney, Agent, or Firm* — FisherBroyles LLP; Kevin D. Jablonski

(57) ABSTRACT

A method and a system for sending alert messages are provided. The method includes defining an alert area associated with an alert event. The method further identifies one or more cells at least partially overlapping with the alert area. The method furthermore performs a passive positioning to determine a first set of communication devices associated with the one or more cells. Thereafter, the method performs an active positioning on the first set of communication devices to identify a second set of communication devices present within the alert area. The method then sends an alert message to the second set of communication devices.

17 Claims, 9 Drawing Sheets

(51) Int. Cl.
    *H04W 4/90*           (2018.01)
    *H04W 4/12*           (2009.01)
    *H04W 4/06*           (2009.01)
    *H04H 60/52*         (2008.01)
    *H04H 20/59*         (2008.01)

(56) References Cited

U.S. PATENT DOCUMENTS

| | | |
|---|---|---|
| 8,320,931 B2 | 11/2012 | Ward et al. |
| 8,718,592 B2 | 5/2014 | Annamalai |
| 2016/0084936 A1 | 3/2016 | Smith et al. |

FOREIGN PATENT DOCUMENTS

| | | |
|---|---|---|
| WO | WO-2014009212 A1 | 1/2014 |
| WO | WO-2014075715 A1 | 5/2014 |

METHODS AND SYSTEMS FOR SENDING LOCATION BASED ALERT MESSAGES

TECHNICAL FIELD

The present disclosure generally relates to sending messages in communication network. More specifically, the present disclosure relates to sending alert messages to communication devices in a wireless communication network.

BACKGROUND

Today, mobile phones are used for various other activities in addition to voice communication. Examples of such activities include, but are not limited to video communication, accessing electronic mails, messaging services, internet surfing, navigation purposes, location based services, using messenger applications, broadcast services and playing offline or online games. The usage of mobile phones, due to the said activities, has increased to a level that users are often reachable throughout the day over their mobile phones. Thus, mobile telephony has become a primary mode of communication and is often kept on highest priority for reaching out to the users during any emergency situations. The users of the mobile phones may be intimated about the emergency situation using voice based services, text based services and/or multimedia based services.

For example, in case of any emergency in an alert area, an alert message is broadcasted to users over their mobile phones in the alert area. In the mobile telephony, for example the Global Systems for Mobile communication (GSM), the users may be warned about the emergency situation using a Cell Broadcasting (CB) with Short Message Service (SMS) which allows a network operator to broadcast a CB alert message to users within a certain cell or group of cells. An area of each cell may range from a few yards to several miles depending upon the number of subscribers and need.

Once the alert area is defined for sending CB alert messages, cells corresponding to the alert area are identified and the alert message is sent to all the users under the identified cells. However, there may be a scenario, where the alert area may be a smaller area than the area covered by the identified cells due to the range defined for each cell. As a result, the alert message will also be received by users who are outside the alert area but are within the range of the identified cells. In a situation, where the alert message is a business related message or any promotional message, it may be acceptable to send such messages to all the users in the identified cells. However, in some scenarios it is important to have high accuracy alerting, so that alert messages are sent only to those users who are within a specific alert area (geographical area) rather than alerting all users under the identified cells. Therefore, knowledge of each user's current location in the identified cells is important prior to sending the alert messages.

SUMMARY

Various methods, systems and computer readable mediums for sending alert messages are disclosed. In an embodiment, a method of sending alert messages in a communication network is provided. The method includes defining an alert area associated with an alert event. The method then identifies one or more cells at least partially overlapping with the alert area. Thereafter, the method performs a passive positioning to determine a first set of communication devices associated with the one or more cells. Further, the method performs an active positioning on the first set of communication devices to identify a second set of communication devices present within the alert area. The method then sends an alert message to the second set of communication devices.

In another embodiment, an alert system for sending alert messages in a communication network is provided. The alert system comprises a memory to store instructions for sending the alert messages. The alert system further comprises a processor operatively coupled with the memory to execute the instructions stored in the memory to cause the alert system to define an alert area associated with an alert event. The processor then further causes the alert system to identify one or more cells at least partially overlapping with the alert area. Further, the processor causes the alert system to perform a passive positioning to determine a first set of communication devices associated with the one or more cells. Furthermore, the processor causes the alert system to perform an active positioning on the first set of communication devices to identify a second set of communication devices present within the alert area. Thereafter, the processor causes the alert system to send an alert message to the second set of communication devices.

In another embodiment, a non-transitory, computer-readable storage medium storing computer-executable program instructions to implement a method of sending alert messages in a communication network, is provided. The method includes defining an alert area associated with an alert event. The method further includes identifying one or more cells at least partially overlapping with the alert area. Thereafter, the method includes performing a passive positioning to determine a first set of communication devices associated with the one or more cells. Further, the method includes performing an active positioning on the first set of communication devices to identify a second set of communication devices present within the alert area. Thereafter, the method includes sending an alert message to the second set of communication devices.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term 'alert event' used throughout the description includes any event in which bulk messages need to be sent to a large subscriber base in any geographical area (also referred to as 'alert area'). The geographical area may range starting from a small cell area to as large as an entire area covered by a wireless communication network. Examples of the alert event may include, but are not limited to emergency events, business promotions, meeting requests, government announcements, advertisements, and the like. Further, the terms 'users' and 'subscribers' are used interchangeably throughout the description.

Figure 1:
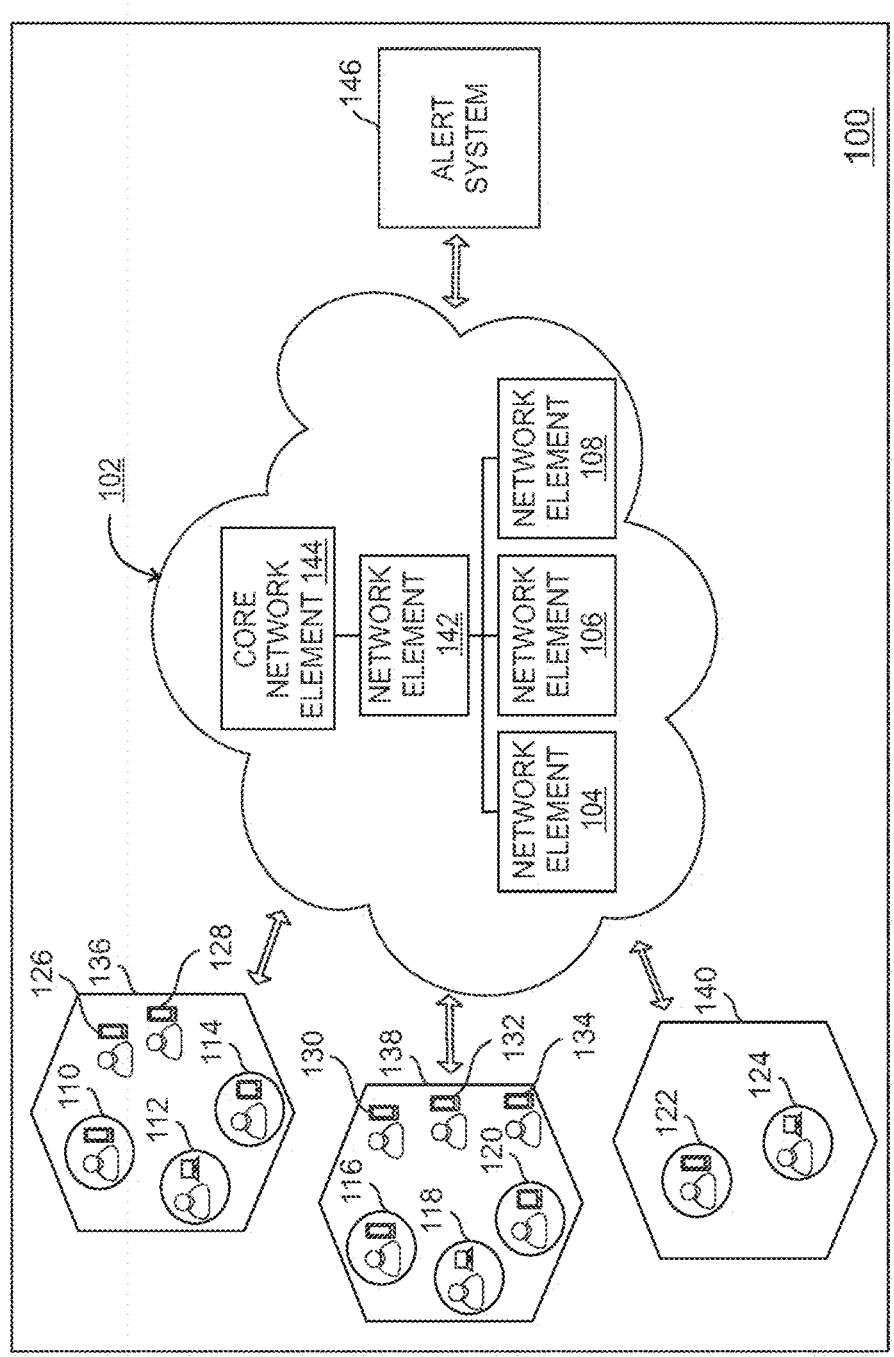
FIG. 1 illustrates an example environment, where various embodiments of the present technology may be practiced.

FIG. 1 illustrates an example environment 100, where various embodiments of the present technology may be practiced. An example representation of the environment 100 is shown depicting a communication network 102 used by a plurality of users (also interchangeably referred to as 'subscribers') through their communication devices (e.g., mobile devices). In this example representation, the plurality of users, for example, a user 110, a user 112, a user 114, a user 116, a user 118, a user 120, a user 122 and a user 124 (hereinafter collectively referred to as the 'users 110-124') and a user 126, a user 128, a user 130, a user 132, and a user 134 (hereinafter collectively referred to as the users '126-134') are shown. In a representation, the users in the communication network 102 are collectively referred to as the users 110-134. An alert system 146 may be associated with the communication network 102. In an embodiment, the alert system 146 is an application module which is configured to send alert messages to users in one or more alert areas (e.g., to the users 110-134 in location areas 136-140) during an alert event. The alert event is an emergency situation or any other scenario that requires sending of an alert message to a large number of subscribers. For instance, examples of the alert event may include, but are not limited to, flash floods, tsunami, earthquakes, hurricane, tornadoes, severe thunderstorms and the like. In other examples, the alert system 146 may be used in a business environment, where a business manager may wish to send bulk alert messages (e.g., for an urgent meeting) to his/her employers located in various locations. Similarly, the alert system 146 may be used by a government agency to send bulk alert messages about launch of government schemes, etc.

The users 110-134 may communicate through the communication network 102 in one or more forms of communication channels, for example, a voice channel, a video channel, a web channel, a messaging channel (such as a short message service (SMS) channel), an interactive voice response (IVR) channel, a native application channel and the like. At any particular time instance, each of the users 110-134 may be associated with a location area as defined in the communication network 102. For example, the users 110, 112, 114, 126 and 128 are associated with the location area 136; the users 116, 118, 120, 130, 132, and 134 are associated with the location area 138; and the users 122 and 124 are associated with the location area 140, respectively. Each user of the plurality of users may communicate in the communication network 102 and is also capable of receiving alert messages from the alert system 146 on respective communication device(s). Examples of a communication device may include, but are not limited to, a cell phone, a Smartphone, a tablet device, a laptop integrated with wireless communication capability and the like.

Examples of the communication network 102 may include cellular networks operating in accordance with protocols including, but not limited to, a second-generation (2G) wireless communication protocol such as IS-136 (time division multiple access (TDMA)), GSM (global system for mobile communication), and IS-95 (code division multiple access (CDMA)); a third-generation (3G) wireless communication protocol, such as Universal Mobile Telecommunications System (UMTS), CDMA1000, wideband CDMA (WCDMA) and time division-synchronous CDMA (TD-SCDMA); a 3.9G wireless communication protocol such as evolved universal terrestrial radio access network (E-UTRAN), a fourth-generation (4G) wireless communication protocol such as LTE (Long-Term Evolution) and a fifth-generation (5G) wireless communication protocol, or the like. In some scenarios, the communication network 102 may also operate in conjunction with other forms of communication networks, for example, a landline network connected to a telephone exchange such as a public switched telephone network (PSTN), a wireless network, a private network (i.e. inside companies, call centers etc.,) and the like.

The communication network 102 is constituted of a variety of network elements (e.g., base stations, controllers, switching centers, location registers, databases, gateways, etc.) that are interconnected in a tiered fashion for offering communication between user communication devices of the users 110-134, the alert system 146 and also with other connected networks. The network elements shown in the communication network 102 are only for the example purposes, and as such, these are provided for the purposes of solely representing some of the example network elements utilized in the communication network 102.

In the example representation of the communication network 102, example network elements such as a network element 104, a network element 106, and a network element 108 (hereinafter referred to as the 'network elements 104-108') may correspond to base stations and related components in various mobile standards, for example, 2G, 3G, 4G, and the like. For instance, any of the network elements 104-108 may include but are not limited to, a transceiver station such as a base transceiver station (BTS), a Node B, an Evolved-Universal Terrestrial Radio Access Network (E-UTRAN) Node B (eNodeB), a Home NodeB (HNB) or a femtocell, an HNB gateway a Home eNodeB (HeNB) and the like. The network elements 104-108 may include equipments for transmitting and receiving signals such as radio signals from user mobile devices (such as the user mobile devices associated with the users 110-134). The network elements 104-108 may also facilitate communication with one or more node controllers that are utilized for controlling and communicating with the network elements 104-108 and the user communication devices. As shown in the communication network 102, a network element 142 may be a node controller for controlling and communicating with the network elements 104-108, for example, node controller and related components in various mobile standards, for example, 2G, 3G, 4G, and the like. For instance, examples of the network element 142 may include, but are not limited to, a base station controller (BSC), a radio network controller (RNC), a mobility management entity (MME), a femtocell gateway (or HNB gateway) and the like.

Typically, the network element (142) is a node controller configured to handle allocation of radio channels and to control handovers within the communication network 102. As such, the network element 142 of the communication network 102 is configured to manage a set of connections of the network elements 104-108 and reduce the number of connections towards a core network element 144. The network element 142 is depicted to control only three network elements (e.g., the network elements 104-108) for example purposes, and it is understood that the network element 142 may communicate with such numerous network elements. Further, the network element 142 may be communicably coupled to the core network element 144 for switching and routing messages between the user mobile devices of the users 110-134, the alert system 146 and other connected networks, for example PSTN or any other service providers. More specifically, when a user (such as the user 110) initiates a call or a message, the core network element 144 is configured to locate a right node controller (in this case the network element 142 shown in FIG. 1) from a plurality of node controllers handled by the core network element 144 by sending paging requests to all or a predetermined number of node controllers associated with the core network element 144. Examples of the core network element 144 may include, but are not limited to a mobile switching centre (MSC), a serving GPRS support node (SGSN), a short message service centre (SMSC), a Home Location Register (HLR) and the like.

In an embodiment, the core network element 144 is associated with one or more switching functions, such as but not limited to: call set-up, release, routing and the like. Additionally, the core network element 144, such as an MSC also performs routing of SMS messages, conference calls, fax, and service billing as well as interfacing with other networks, such as the PSTN.

It should be noted that the communication network 102 may include a variety of other network elements, switches, gateways, routers, repeaters, antennas, etc., for the communication purposes, and herein for the purposes of the present description, only some of the relevant network elements are described. In an implementation, the core network element 144 may be connected to at least one visitor location register (VLR) for storing subscriber record of all user mobile devices that are currently located within the coverage of the network elements 104-108 associated with the core network element 144. Some other non-exhaustive examples of sourcing of subscriber records (e.g., location information) include integrating with one or more location sources in the communication network 102. For instance, examples of integrating with the one or more location sources include, but are not limited to, integrating with probes installed on interfaces such as A-Interface, IuCS interface, IuPS interface, S1 interface, Abis interface, IuB interface, and the like; integrating with mobile positioning systems in the communication network 102; and integrating with MSC call data records (CDRs) with location events.

The subscriber record may include information such as details of the subscriptions and/or services associated with the user mobile devices (e.g., cell phones) for example a mobile station international subscriber directory number (MSISDN) or a telephone number, an international mobile subscriber identity (IMSI), location information and the like. Without loss of generality, in an implementation, a home location register (HLR) or a home subscriber server (HSS) may provide information about the subscribers to the VLR. In some scenarios, the core network element 144 may directly communicate with the VLR instead of HLR/HSS for performing handover function to any of node controllers associated with the MSC. Moreover, the VLR may be configured to be updated on a regular basis from the HLR/HSS. The HLR/HSS stores the subscriber record of all the subscribers (or users) associated with the communication network 102 along with details of the MSC servicing the subscribers at that time.

In wireless communication networks, such as the communication network 102, geographic regions are divided into cells where each cell covers a specific geographical area. A network element, such as from among the network elements 104-108, is configured to provide network coverage within a cell. Moreover, a cell corresponds to antenna coverage of a network element which transmits and receives radio broadcasts for the communication network 102. As shown in the communication network 102, each network element from among the network elements 104-108 may be configured to facilitate communication to at least one location area (or cell) from among the location areas 136-140. For example, the network element 104 may be configured to facilitate communication to the location area 136 associated with the users 110, 112, 114, 126 and 128; the network element 106 may be configured to facilitate communication to the location area 138 associated with the users 116, 118, 120, 130, 132 and 134; and the network element 108 may be configured to facilitate communication to the location area 140 associated with the users 122 and 124. It is understood that, the network elements 104-108 may be configured to be installed or fixedly placed in their respective locations (e.g., the location areas 136-140) as transceivers for communicating with the user mobile devices of the users 110-134 over the one or more communication channels. It is also to be understood that the network elements 104-108, the users 110-134 and the location areas 136-140 may be associated with one or more wireless communication networks such as the communication network 102.

During alert event scenarios such as an emergency event, a business need, a government broadcasting of information, and the like, the alert system 146 may send alert messages to all the users (subscribers) located in alert areas that are associated with the alert event scenarios. Without loss of generality, the alert area is defined using a map or a predefined location/area name, prior to sending the alert messages. Once the alert area is defined, one or more cells overlapping the alert area are identified. To cover the entire alert area, each cell may either completely or partially overlap the alert area. Therefore, if a cell completely overlaps the defined area then all the subscribers associated with the cell should be notified about the emergency event. However, if the cell partially overlaps the alert area then only the subscribers under the partially overlapping area should be notified about the emergency event, as such alert may not be applicable for other users.

In the environment 100, an alert area and the alert message are defined using the alert system 146. Thereafter, one or more cells areas overlapping with the alert area are identified. Each cell corresponds to a location area. In the environment 100, the alert system 146 is used to define an alert area (e.g., a target alert area). The alert area is then mapped to identify overlapping cells, for example, the cells 136-140 are identified to be overlapping the alert area defined in the environment 100. In an example and for the purpose of this description, the alert areas 136 and 138 are identified as partially overlapping the alert area and the alert area 140 is identified as fully overlapping the alert area (e.g., the target alert area). Thereafter, the alert message is sent only to the users who are associated with the target alert area in the cells 136-140. Therefore, in the said example, the alert message is sent to all the users under the cell 140 as the cell 140 is said to be completely overlapping the target alert area.

However, as the cell 136 and 138 partially overlap the alert area, the users who are within the alert area in the cells 136 and 138 are identified. For example, in the cell 136, the users 110, 112 and 114 are identified to be within the alert area and the users 126 and 128 are identified to be outside the alert area. Similarly, in the cell 138, the users 116, 118 and 120 are identified to be within the alert area and the users 130, 132, and 134 are identified to be outside the alert area. For the sake of clarity and the purpose of this description, the users within the alert area are circled for representation purpose and clarity. Therefore, the users 110-124 (circled in FIG. 1 for clarity) of the cells 136-140 are identified to be within the alert area and similarly the users 126-134 are identified to be outside the alert area. The alert message will only be sent to the communication devices 110-124.

In various embodiments of the present disclosure, identification of users for sending the alert messages is done using hybrid positioning of the communication devices associated with the users. The hybrid positioning includes performing passive positioning and active positioning on the communication devices associated with the users under the identified one or more cells. The hybrid positioning is thus used to identify accurate location of each user and thereby creating an accurate list of users (communication devices) for sending alert messages. The passive positioning is explained in detail in conjunction with FIG. 5 and the active positioning is explained in detail in conjunction with FIG. 6.

Today, such identification of users and selective broadcasting of alert message in a given cell exclusively for the users under the defined alert area is not done. Presently, the alert message is broadcasted to all the users under a given cell even if such message is not relevant to some of them. Thus, the method of sending alert message in the environment 100 takes care of such scenarios. The method of defining the alert area and mapping the alert area on the cells is further explained with reference to FIGS. 2, 3 and 4. The alert system for sending alert messages in a communication network is explained with reference to FIG. 7 and the method of sending alert messages in a communication network is further explained with reference to FIGS. 8 and 9.

Figure 2:
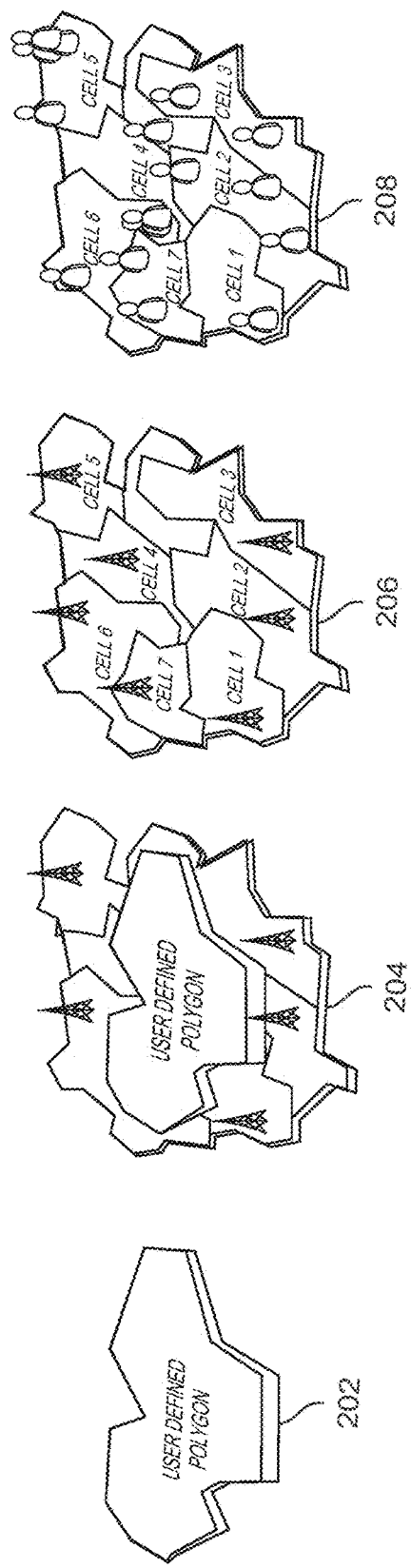
FIG. 2 illustrates an example depiction of identifying one or more cells associated with an alert area, in accordance with an example embodiment.

FIG. 2 illustrates an example depiction of identifying cells associated with an alert area, in accordance with an example embodiment. At 202, a user defined polygon is created to mark an alert area. In an embodiment, the user defined polygon could be user defined by outlining an area on a map. In another embodiment, the alert area is defined by explicitly entering area/location/city in the alert system 146. For example, a location 'Stockport' in 'Manchester' could be entered as the alert area. In an embodiment, an alert application in the alert system 146 provides the user with an option of defining polygon for the alert area and/or provides an option to explicitly input the alert area based on name of area, locality and city.

At 204, the user defined polygon 202 is mapped on a geographical area. In a wireless communication network, for example the communication network 102, the geographical area is divided into cells. Each cell is associated with a network element, for example Base Transceiver Station (BTS), for enabling wireless communication for users. The communication network 102 includes the network elements 104-108 for enabling communication between the users 110-134. The network elements 104-108 corresponds to base stations and related components in various mobile standards, for example, 2G, 3G, 4G, and the like.

At 206, one or more cells overlapping the user defined polygon are identified in the geographical area. To entirely cover the user defined polygon 202, the one or more cells either fully or partially overlap the user defined polygon 202. At the step 206, Cell 1, Cell 2, Cell 3, Cell 4, Cell 5, Cell 6 and Cell 7 (collectively called as Cells 1-7) are identified to be covering the entire user defined polygon 202. In an embodiment, each cell in the Cells 1-7 either partially or completely overlaps the user defined polygon 202. The Cells 1-7 are identified by querying a cell inventory in the communication network 102. The cell inventory includes an inventory of cells covering the geographical areas within the communication network, location of the cell or cellular coverage associated with each of the cell.

At step 208, users associated with the cells overlapping the alert area are identified. For example, all the users associated within the Cells 1-7 are identified at step 208. In an embodiment, all the users in each overlapping cell are identified using a location database associated with the communication network 102. In an embodiment, communication devices associated with all the users within the Cells 1-7 is referred to as 'first set of communication devices'. Thereafter, a set of users who are under the user defined polygon from the first set of communication devices are identified. In an embodiment, communication devices associated with the set of users under the user defined polygon is referred to as 'second set of communication devices'. The alert message is then sent to the second set of communication devices i.e. to the users under the user defined polygon 202.

Figure 3:
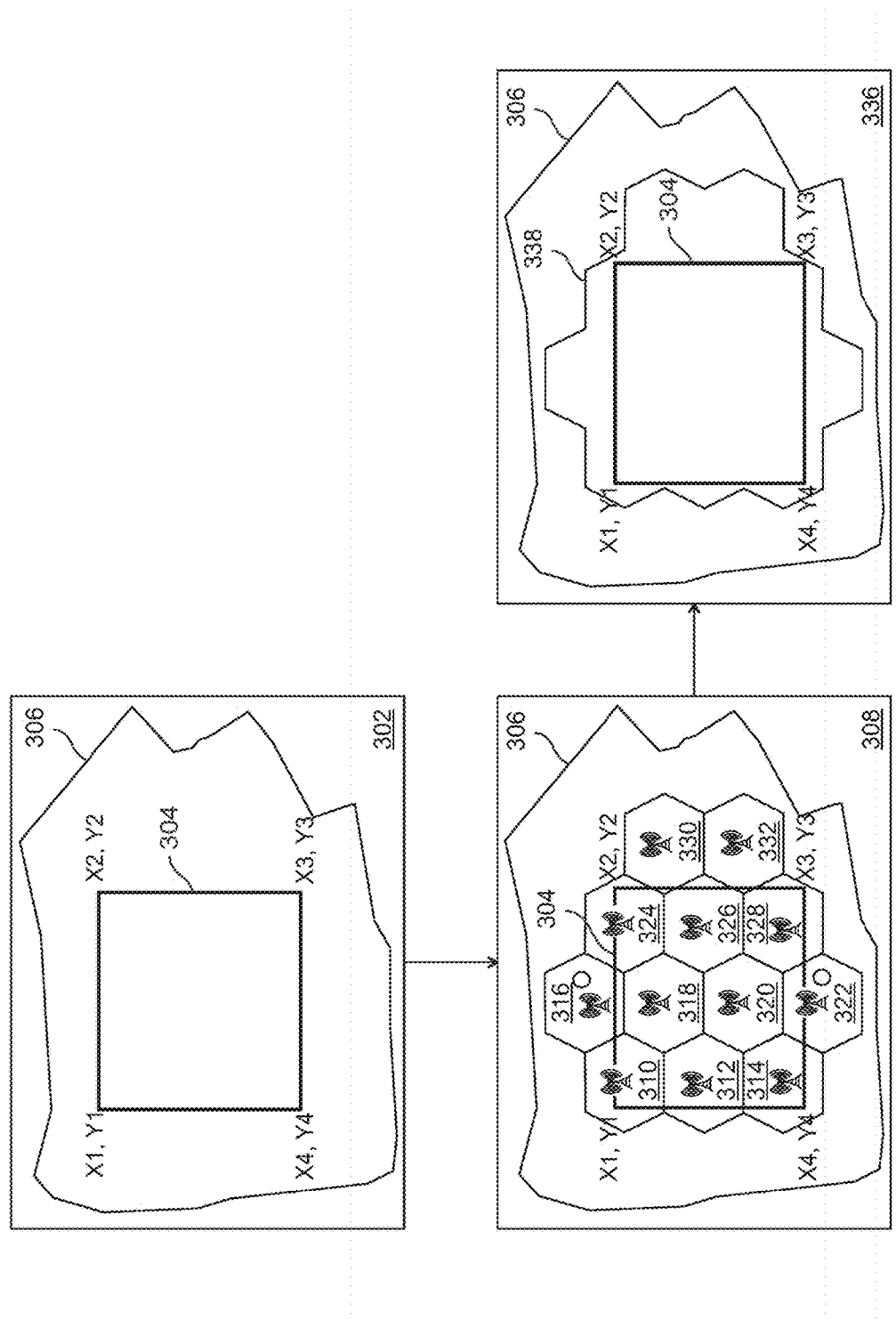
FIG. 3 illustrates an example depiction of identifying the alert area and an exclude area in the one or more cells, in accordance with an example embodiment.

FIG. 3 illustrates an example depiction of identifying the alert area and an exclude area in the identified cells, in accordance with an example embodiment. At 302, an alert area 304 is defined and marked on a map 306. The alert area 304 is a rectangle that is defined using example co-ordinates (X1Y1, X2Y2, X3Y3 and X4Y4). In an embodiment, the coordinates are given as input to an alert application and the location is then marked on the map using the alert application. In another embodiment, the coordinates are automatically identified based on an area/location/city input given by the user in the alert application.

At 308, cells overlapping with the alert area 304 are identified. For example, the entire alert area 304 is covered by 12 cells. The 12 cells include cell 310, cell 312, cell 314, cell 316, cell 318, cell 320, cell 322, cell 324, cell 326, cell 328, cell 330 and cell 332, collectively referred as cells 310-332. The cells 310-332 are identified using a cell inventory. The cells may either completely or partially overlap to cover the entire alert area 304. For example, in the cells 310-332, the cell 318 and the cell 320 completely overlap the alert area 304 and all the other cells partially overlap the alert area 304.

At 336, the maximum area covered by the cells 310-332 communication is outlined. The boundary of the maximum area covered by the cells 310-332 is referred as an area 338. The area 338 is a super area in which the cells 310-332 collectively provide communication coverage. However, the defined alert area 304 is a subset of the area 338. An exclude area is then identified based on the area 338 and the area 304. The exclude area is a section of the area 338 which is not overlapped by the alert area 304. Thus the users under the exclude area should be excluded from sending the alert message. For identifying users under the exclude area, initially all the users within the area 338 are determined. Thereafter, the location of each user is determined using an active positioning performed on the mobile device or the communication device of the user. The user is then determined to be either within the alert area 304 or outside the alert area 304. Therefore, the alert message is sent to only the users who are under the alert area 304.

Figure 4:
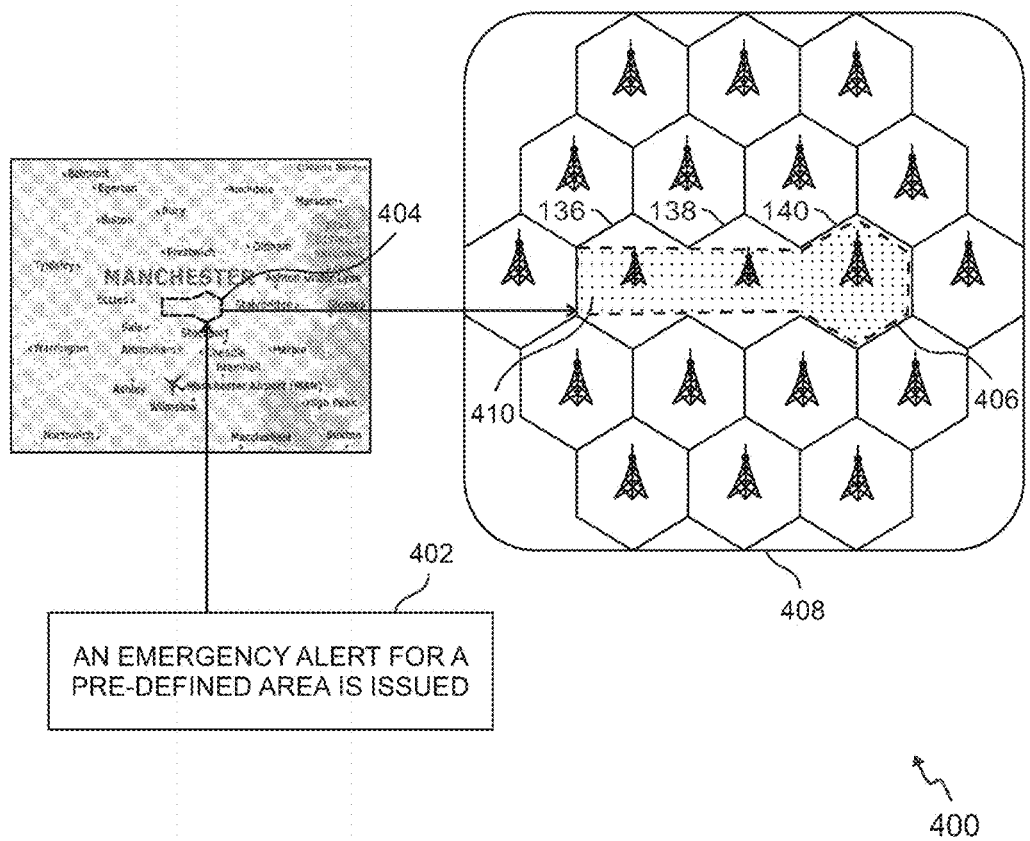
FIG. 4 illustrates an example block diagram depiction of a method of defining an alert area in accordance with an example embodiment.

FIG. 4 illustrates an example schematic depiction (400) of method of defining an alert area in accordance with an example embodiment. At step 402, an alert for a predefined area is issued or created. In an embodiment, alert authorities are provided with an option to create or input the alert information associated with an alert event through an alert application. In an embodiment, the predefined area (the alert area) is marked on a map (see 404). Thereafter, the geo-coordinates associated with the marked area on the map are determined. In an embodiment, the alert area is explicitly entered using the geographical location name. For the purpose of this explanation, a Manchester map is shown in FIG. 4 and an area 404 is marked on the map by the user for sending alert message. After the alert area 404 is marked, the method identifies the geo-coordinates associated with the alert area 404. In an embodiment, the alert area 404 can be sub area of a larger cell coverage area. For example, a user can select only a specific area, like a street name, in Stockport. In another embodiment, the alert area 404 may be defined in using ZIP codes, area name and the like.

At 406, the method identifies one or more specific site associated with the alert area 404 using the identified geo-coordinates. At 406, a cell site 408 represents an example of geographically contiguous cell sites capable of providing wireless communication coverage to the defined alert area 404 and surrounding areas. In an example, the cell 136, the cell 138 and the cell 140 are identified as the cells corresponding to the alert area 404. The cells (136-138) are identified and shown for example representation purposes only and the number of cells corresponding to the alert area 404 could be more or less based on cell coverage. Thereafter, all the users under the cells 136-140 are identified using a location database, for example the users 110-134 of the cells 136-140 are identified using a passive positioning.

In an embodiment, the cell area corresponding to the identified cells or the location areas 136-140 may be greater than the alert area 404. Therefore, the alert message should be sent only to the users associated with the alert area 404 in the identified cells 136-140. Hence, an area 410 is identified in the cell 136-140 that corresponds to the alert area 404. For clarity and for the purpose of this description, the area 410 is represented in FIG. 4 with dotted pattern. The users under the area 410 are then identified from among all the users (for example, the users 110-134) in the cells 136-140. For example, also referring back to FIG. 1, the users 110-124 in the cells 136-140 are identified to be under the alert area 410 and users 126-132 are identified to be in an area outside the alert area 410. In an embodiment, all the users (for example, the users 110-132) associated with the cells 136-140 are identified using the passive positioning. Further, the users associated with the alert area 410 within the cells 136-140 are identified by performing the active positioning on communication devices of the users 110-132. Hence, the alert message is sent only to the communication devices associated with the users 110-124.

Figure 5:
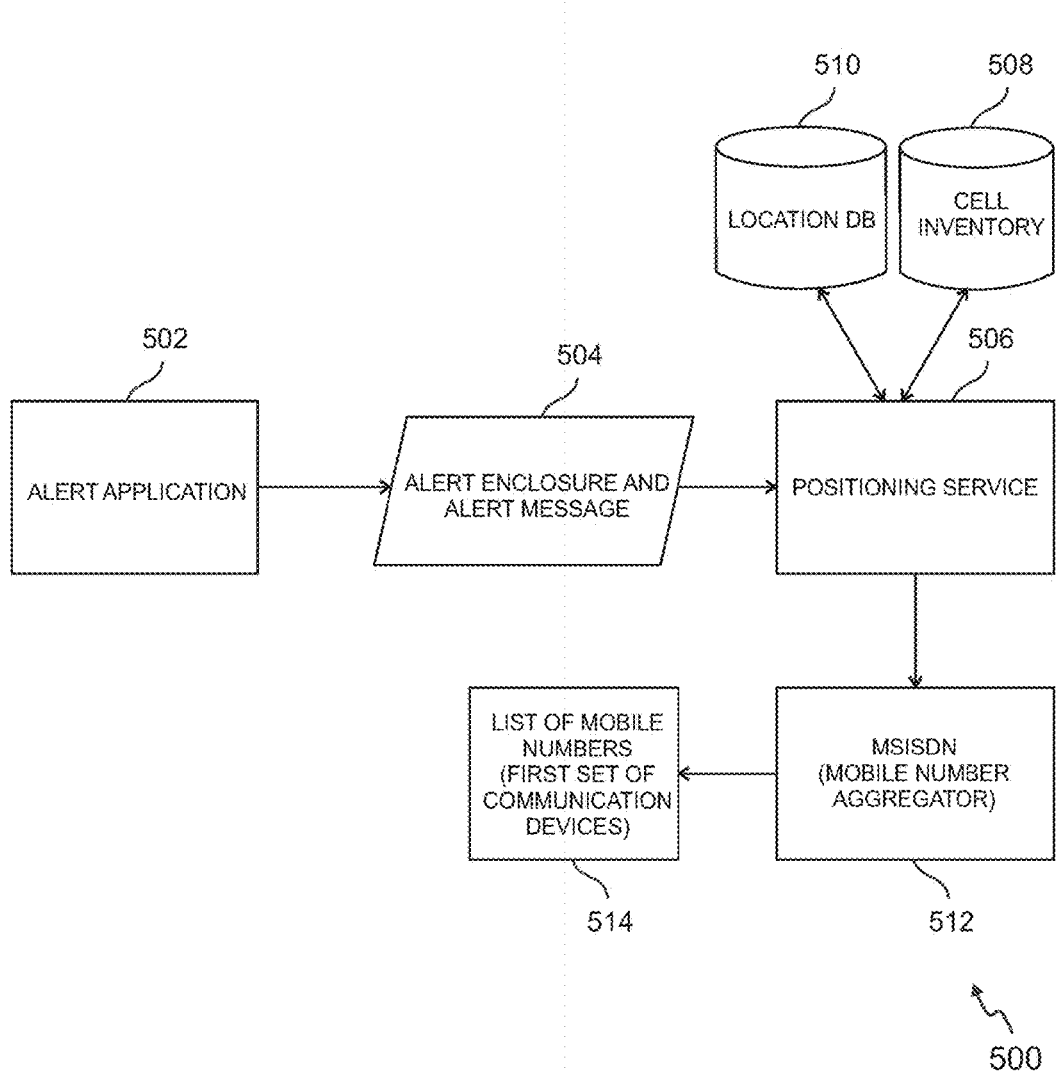
FIG. 5 illustrates an example block diagram depiction of a passive positioning to identify a first set of communication devices in the one or more cells, in accordance with an example embodiment.

FIG. 5 illustrates a block diagram depiction of performing a passive positioning 500 to identify a first set of communication devices in the one or more cells, in accordance with an example embodiment. At 502, an alert application enables a user to define a polygon or alert enclosure for sending an alert message. In an embodiment, the alert application is a Geographic Information System (GIS) application. The GIS is a system that manages and presents geographical data. The GIS applications are tools that allow users to create interactive queries, analyze spatial information, marking geo-coordinates or geographical area in maps, and present the results of all such operations. At 504, the user defined polygon or alert enclosure is sent to a positioning service. In an embodiment, an alert message is also sent along with polygon or alert enclosure. In an embodiment, the positioning service is a software service hosted inside the communication network 102.

At 506, the positioning service queries a cell (base station) inventory 508 based on an area of the alert enclosure. In an embodiment, the cell inventory 508 is a database including a list of cells and their corresponding location and geographical coverage information. Responsive to querying the cell inventory 508, one or more cells overlapping the alert enclosure are identified (explained in detail in conjunction with FIGS. 2 and 3). The one or more cells may partially or completely overlap the alert enclosure. Post identifying the one or more cells overlapping the alert enclosure (polygon), the list of users in each cell is then derived from a location database (DB) 510. In an embodiment, the location DB 510 contains the list of users in a communication network, their corresponding cells and serving network entities, like Base Transceiver Stations (BTSs'). The list of users is refreshed at a predefined interval of time for keeping the location DB up to date with latest information associated with the communication devices.

In an embodiment, the data in the location DB 510 is gathered via passive probes that constantly monitor various network interfaces to detect handoff, location changes, signals and user activities. The user activities include, but are not limited to, data activity, voice communication, data communication or a Short Message Service (SMS) activity. For example, in the communication network 102, the location DB 510 contains information about the users 110-134, their cells 136-140, and the network elements 104-108. Thus, all the users in the one or more cells are observed based on their communication device number (also referred as Mobile number) or Mobile Station International Subscriber Directory Number (MSISDN). The MSISDN is a number uniquely identifying a subscription in a communication network.

At 512, all the mobile numbers or MSISDN associated with the users under the one or more cells are aggregated. At 514, a list of mobile numbers or MSISDNs associated with the one or more cells overlapping the alert area is created. For the purpose of this description, the created list of mobile numbers or MSISDNs is also referred as the first set of communication devices. Therefore, the list of all the users (the first set of users) associated with the one or more cells overlapping the alert area is identified using the passive positioning.

Figure 6:
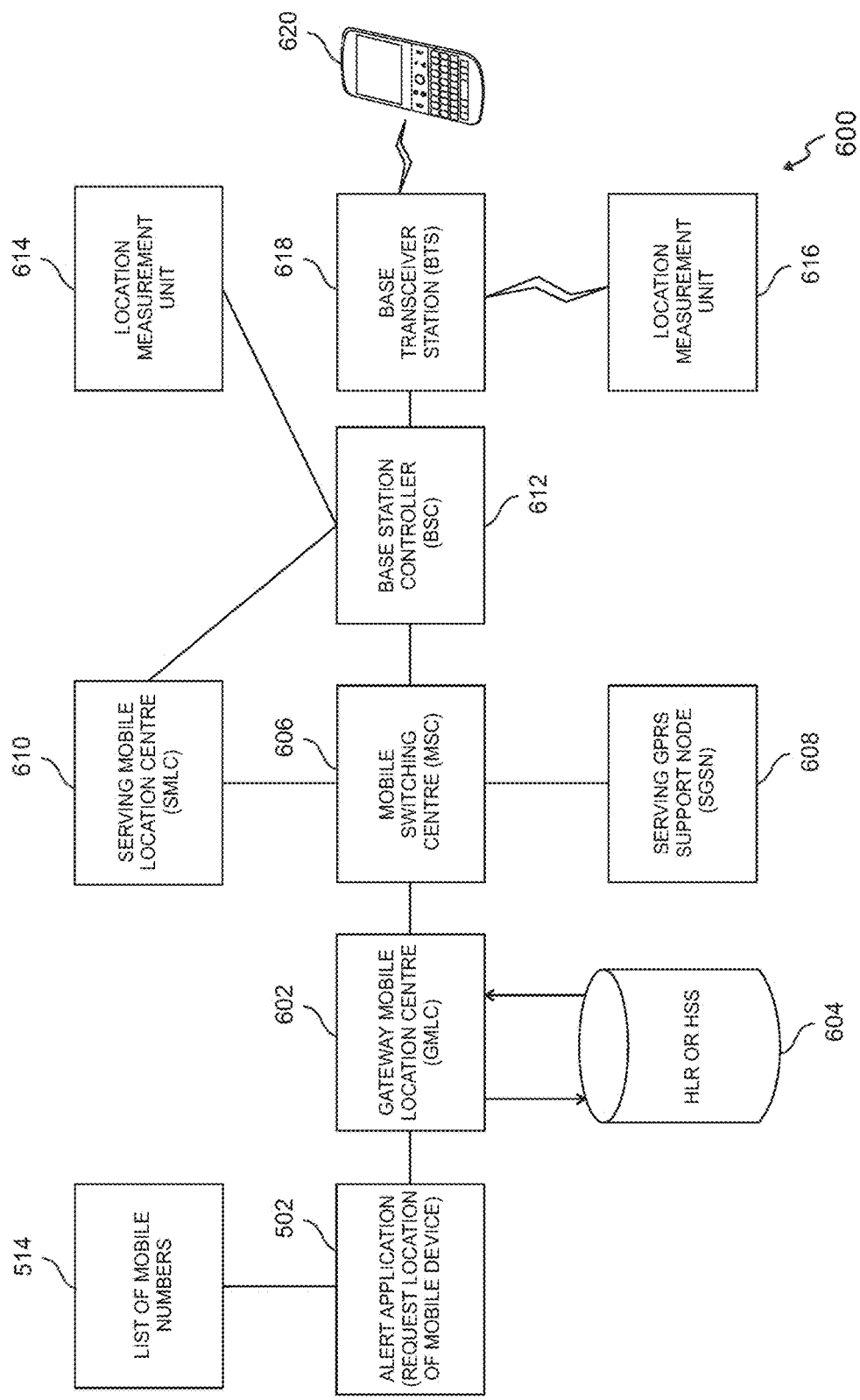
FIG. 6 illustrates an example block diagram depiction of an active positioning on the first set of communication devices, in accordance with an example embodiment.

FIG. 6 illustrates a schematic block diagram depiction of an active positioning 600 on the first set of communication devices, in accordance with an example embodiment. The schematic block diagram of the active positioning 600 includes an alert application, for example the alert application 502 associated with the list of mobile numbers or Mobile Station International Subscriber Directory Numbers (MISISDNs) 514. In an embodiment, the alert application 502 is configured to create suitable alert messages that are sent to a plurality of users associated with an alert area during an alert event. Additionally, the alert application 502 is also configured to send location requests to network components of a communication network to identify current location of communication devices.

In an embodiment, the alert application 502 is configured to request location of each communication device in the first set of communication devices. In an embodiment, location request is made using mobile numbers or MSISDNs associated with the communication devices. For the sake of clarity and for the purpose of this description, location of a mobile device 620 is requested by the alert application 502. In an embodiment, the alert application 502 is configured to communicate with a Gateway Mobile Location Centre (GMLC) 602. To request location of the mobile device 620, the alert application 502 sends mobile number to the GMLC component 602. Thus, the alert application 502 interfaces with the GMLC 602 to request the location of the mobile device 620 in the communication network. In an embodiment, the GMLC 602 provides a gateway functionality that allows a connection between the applications that are outside of the communication network with the components within the communication network.

The GMLC 602 is configured to communicate with Home Location Register (HLR) or Home Subscriber Server (HSS) 604 (hereinafter referred to as HLR 604). The HLR 604 keeps a record of users/communication devices that have subscribed to the communication network and also services available to them. In an embodiment, the HLR keeps a record of each user based on a mobile number associated with user's communication device. The HLR 604 also provides additional data associated with the mobile numbers, like registration information, routing information, and the like. Thus, the GMLC 602, after receiving location request from the alert application 502, request registration information and routing information of the mobile device 620 from the HLR 604. In response to the request, the HLR 604 sends routing information, to like to a serving Mobile Switching Centre (MSC) associated with the mobile device 620. The GMLC 602 then sends a positioning request to an appropriate Mobile Switching Centre (MSC), for example an MSC 606. In an embodiment, the GMLC 602 may send the positioning request to Serving GPRS Support Node (SGSN) 608 or Visited Mobile Switching Centre (VMSC).

The MSC 606 is further configured to communicate with the SGSN 608 and a Serving Mobile Location Center (SMLC) 610. The MSC 606 then pages the mobile device 620 and identifies a serving Base Station Controller for the mobile number 620. In an example, a BSC 612 is identified as the BSC associated with the mobile device 620. The MSC 606 then sends the location request message for the mobile device 620 to the BSC 612. Thereafter, the BSC 612 routes this request to an appropriate SMLC, for example the SMLC 610, configured to communicate with BSC 612. In an embodiment, the SMLC 610 may reside in the BSC 612. The SMLC 610 calculates network-based location of the mobile station 620. In an embodiment, the SMLC 610 may control several Location Measurement Units (LMUs), for example LMU 614 and LMU 616. The LMU devices are either connected to a Base transceiver Station (BTS), for example a BTS 618 via GSM air interface or connected to the BSC 612 via the interface used to connect BTSs. The BTS 618 is the transceiver station to which the mobile device 620 is associated. The LMUs 614 and 616 measure radio signals to find the mobile station 620 in area served by the SMLC 610. Without loss of generality, in an embodiment, the SMLC 610 calculates location of the mobile device 620 using the Timing Advance (TA) method and/or triangulation method.

Once, the location of the mobile device 610 is determined the SMLC 610 sends the location information to the BSC 612. The BSC 612 then sends the location information to the MSC 606 in response to the location query received from the MSC 610. The MSC 610 thereafter returns the received location information to the GMLC 602 which in turn forwards the location back to the alert application 502. This location is then mapped with the alert area and if the location of the mobile phone 620 is found to be within the alert area then the mobile phone 620 will be included for sending the alert message. Therefore, the above mentioned steps are performed for each communication device in the first set of communication device to prepare a second set of communication device. As a result, the second set of communication devices are identified as the communication devices that are within the alert area.

Figure 7:
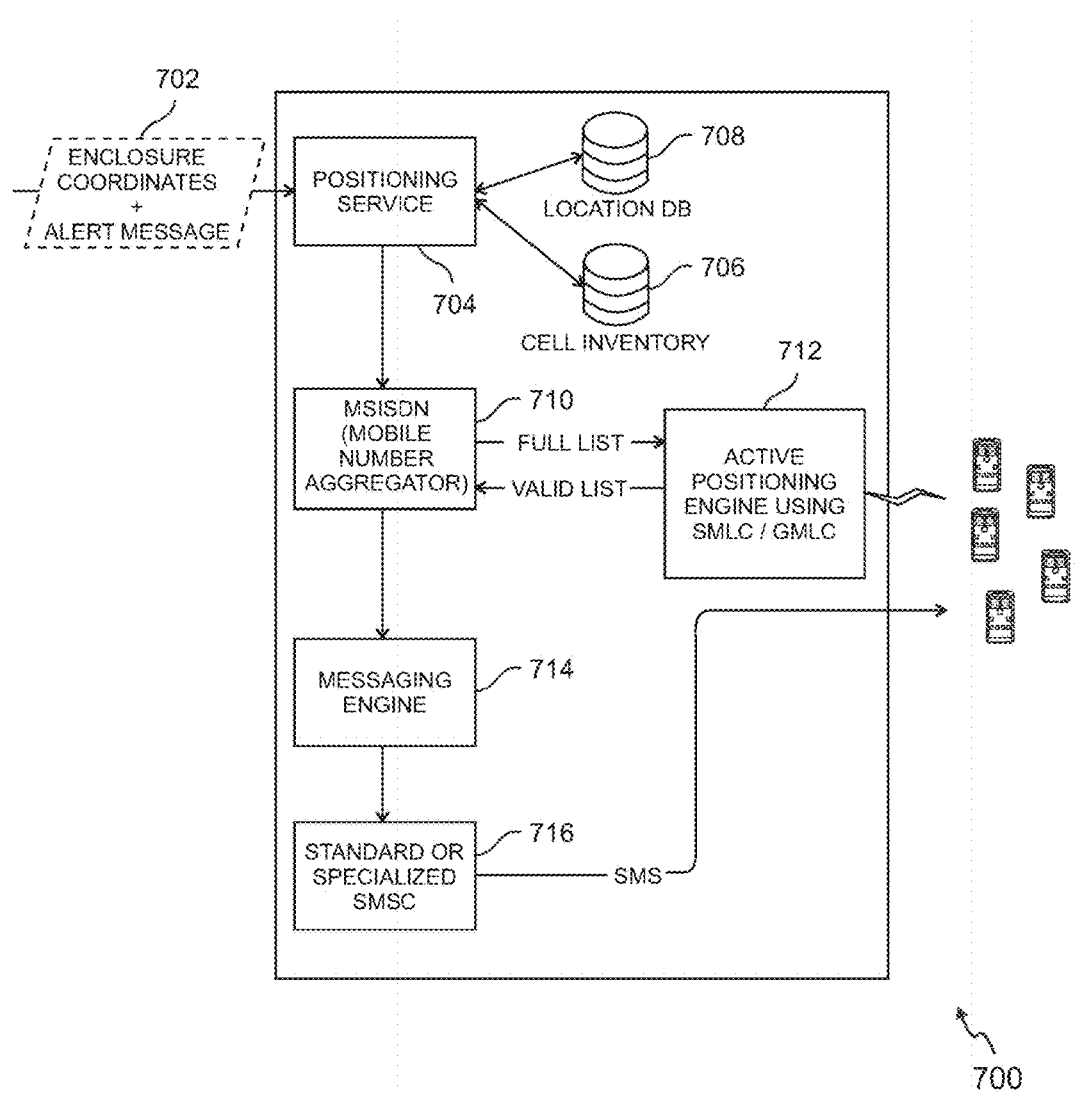
FIG. 7 illustrates a block diagram for sending an alert message, in accordance with an example embodiment.

FIG. 7 illustrates a schematic block diagram representation 700 for sending alert message, in accordance with an example embodiment. At 702, enclosure coordinates corresponding to an alert area are sent to a positioning service. In an embodiment, the alert message is also sent along with the enclosure coordinates. In an embodiment, the positioning service is a software service hosted inside the communication network 102 capable of receiving information associated with alert message.

At 704, the positioning service queries a cell inventory 706 to identify one or more cells overlapping the alert area. The one or more cells may partially or completely overlap the alert area. Once the one or more cells overlapping the alert area are identified, the list of users associated with the one or more cells is then derived from a location database (DB) 708. In an embodiment, the location DB 708 contains the list of users (based on mobile numbers) in a communication network, their corresponding cells and serving network entities.

In an embodiment, the data in the location DB 708 is gathered via passive probes that constantly monitor various network interfaces to detect handoff, location changes, signals and user activities. Thus, all the users in the identified one or more cells are distinguished based on their communication device number (also referred as Mobile number) or Mobile Station International Subscriber Directory Number (MSISDN). The MSISDN is a number uniquely identifying a subscription in a communication network.

At 710, all the mobile numbers or MSISDNs associated with the users under the one or more cells are aggregated. At 710, a full list of mobile numbers or MSISDNs associated with the one or more cells overlapping the alert area is created. For the purpose of this description, the list of mobile numbers or MSISDN is also referred to as a first set of communication devices. Therefore, the full list of all the users (i.e. the first set of communication devices) associated with the one or more cells is identified using the passive positioning. For example, referring to the environment 100 as depicted in FIG. 1, the full list (or first set) of communication devices include mobile device associated with the users 110-134.

At 712, an active positioning (e.g., the active positioning 600) is performed for each communication device of the first set of communication device to identify the accurate location of each mobile device. In an example, the active positioning is performed on mobile devices associated with the users 110-134. In an embodiment, the active positioning uses components GMLC and SMLC to identify the location of communication devices. Once, the location of each communication devices in the first set of communication devices is identified, a valid list of communication devices is created. In an embodiment, the valid list is a second set of communication devices. The valid list of communication devices (or the second set of communication devices) is created by identifying the users who are actually under the alert area based on their identified location. In an example, the active positioning is explained in detail in conjunction with FIG. 6.

At 714, a messaging engine analyzes the alert message and selects valid list (second set) of communication devices. At 716, a standard or a specialized short message Switching Centre (MSC) is identified corresponding to the mobile devices and an alert message, through Short Message Service (SMS), is sent to the users who are under the alert area.

Figure 8:
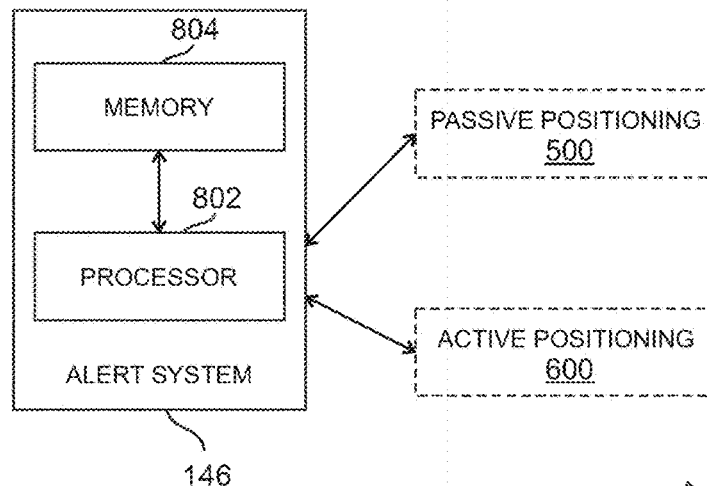
FIG. 8 is a block diagram including the alert system, in accordance with an example embodiment.

FIG. 8 illustrates a block diagram 800 including the alert system 146, in accordance with an example embodiment. The alert system 146 may be any machine capable of executing a set of instructions (sequential and/or otherwise) so as to send alert messages in a communication network. The alert system 146 is shown to include a processor 802 and a memory 804 operatively coupled with each other for sending alert messages. It is understood that the alert system 146 is depicted to include only one memory and one processor for example purposes and that the alert system 146 may include fewer or more components than those depicted in FIG. 8.

It should further be noted that the alert system 146 may be a distributed or a unified system. In an embodiment, the alert system 146 includes at least one memory, for example the memory 804, capable of storing machine executable instructions, and the processor 802 capable of executing the stored machine executable instructions for performing tasks such as facilitating in defining the alert area, facilitating in performing the hybrid positioning (combination of passive positioning and active positioning) to identify user communication devices in the alert area, and sending the alert messages in the communication network 102. Examples of the memory 804 include, but are not limited to, volatile and/or non-volatile memories. For instance, the memory may be volatile memory (e.g., registers, cache, RAM), non-volatile memory (e.g., ROM, EEPROM, flash memory, etc.), or some combination of the two. The memory 804 stores software, for example, set of instructions that can, for example, implement the technologies described herein, upon execution. For example, the memory 804 may be configured to store information, data, applications, instructions for enabling the alert system 146 to carry out various functions in accordance with various example embodiments.

In an embodiment, the processor 802 may be embodied as a multi-core processor, a single core processor, or a combination of one or more multi-core processors and one or more single core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

In an example embodiment, the alert system 146 is configured to send an alert message to communication devices, for example the communication devices of the users 110-124, in an alert area in the communication network 102. In an example scenario, when an alert event or emergency information is received for an alert area, the processor 802 in the alert system 146 is configured to define an alert area associated with the alert event. The processor 802 then identifies one or more cells at least partially overlapping or fully overlapping the alert area (see FIG. 3). For example, the cells 310-332 overlap the alert area 304 in which the cells 318 and 320 are fully overlapping and the remaining cells are partially overlapping the alert area 304. In an embodiment, the processor 802 identifies the one or more cells by querying a database. The database is also referred as a cell inventory and includes information like inventory of cell areas within the communication network 102, location of the cell areas and/or cellular coverage associated with each cell area. Thereafter, the processor 802 facilitates in performing a passive positioning (e.g., the passive positioning 500) to identify all the communication devices associated with the cells overlapping the alert area. For example, all the communication devices associated with the cells 310-332 are identified. In an embodiment, all the communication devices associated with the one or more cells are referred as a first set of communication devices. The passive positioning 500 is explained in detail in conjunction with FIG. 5.

Further, the processor 802 is also configured to cause performing an active positioning (e.g., the active positioning 600) on each communication device of the first set communication devices to identify a second set of communication devices present within the alert area. The active positioning identifies the location information of the communication devices under the cells and checks whether the location of communication device is within the alert area or outside the alert area. Thus, the second set of communication devices is created which include the communication devices that are within the alert area. The second set of communication devices are identified from the first set of communication devices using the active positioning 600 which is explained in detail in conjunction with FIG. 6. Further, the processor 802 is configured to send the alert message to the second set of communication devices.

Figure 9:
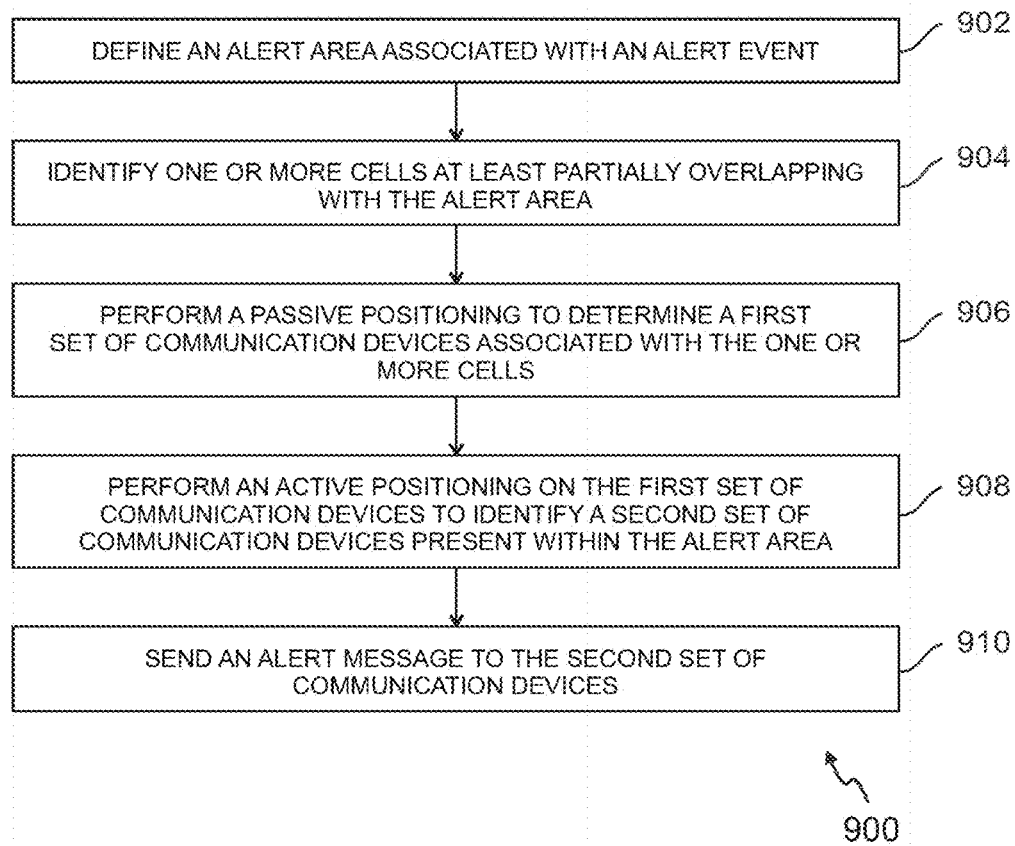
FIG. 9 illustrates a flow diagram depicting a method for sending an alert message, in accordance with an example embodiment.

FIG. 9 illustrates a flow diagram depicting a method 900 for sending an alert message, in accordance with an example embodiment. At step 902, an alert area is defined for an alert event. In an embodiment, the alert area is defined by marking coordinates on a map or manually entering a predefined location name. In another embodiment, the alert area is defined using an alert application 502. The defining of the alert area is also pictorially represented at 204 in FIG. 2, at 302 in FIG. 3 and at 404 in FIG. 4. At step 904, one or more cells at least partially overlapping with the alert area is identified. The one or more cells overlapping the alert area is explained in conjunction with FIG. 3 and FIG. 4. For example, at 308 in FIG. 3, the cells 310-332 are identified as the one or more cells overlapping the alert area. Similarly, at 406 in FIG. 4 the cells 136, 138 and 140 are identified as the one or more cells overlapping the alert area. In an embodiment, the one or more cells either partially or completely overlaps the alert area (see FIG. 3 and FIG. 4).

At step 906, a first set of communication devices associated with the one or more cells are determined by performing a passive positioning. The passive positioning is explained in detail in conjunction with FIG. 5. The first set of communication devices includes all the communication devices associated with the users under the one or more cells. For example, in the environment 100 communication devices associated with the users 110-134 that are associated with the cells 136-140 are identified as the first set of communication devices. In an embodiment, the users associated with the first set of communication devices are identified using location Database (DB). The location DB contains a list of all users in a communication network, their corresponding cells and serving network entities, like Base Transceiver Stations (BTSs').

At step 908 a second set of communication devices present within the alert area is identified by performing an active positioning on the first set of communication devices. The active positioning identifies location of each communication device in the first set of communication devices. Thereafter, the location of the communication device is mapped with the alert area to identify if the location of the communication device is within the alert area or outside the alert area. A communication device is included in the second set of communication devices, if the location of the communication device is within the alert area. The same method is applied to all the communication devices in the first set of communication devices to identify which communication devices are within the alert area and which communication devices are outside the alert area. Therefore, the method 900 uses the active positioning to identify the second set of communication devices that are located within the alert area. The active positioning 600 is explained in detail in conjunction with FIG. 6.

At step 910, the method 900 sends the alert message to the second set of communication devices. Thus, the method 900 sends the alert message only to the users who are within the alert area and not to all the communication devices associated with the one or more cells, thereby making the broadcast of alert messages more accurate.

Figure 10:
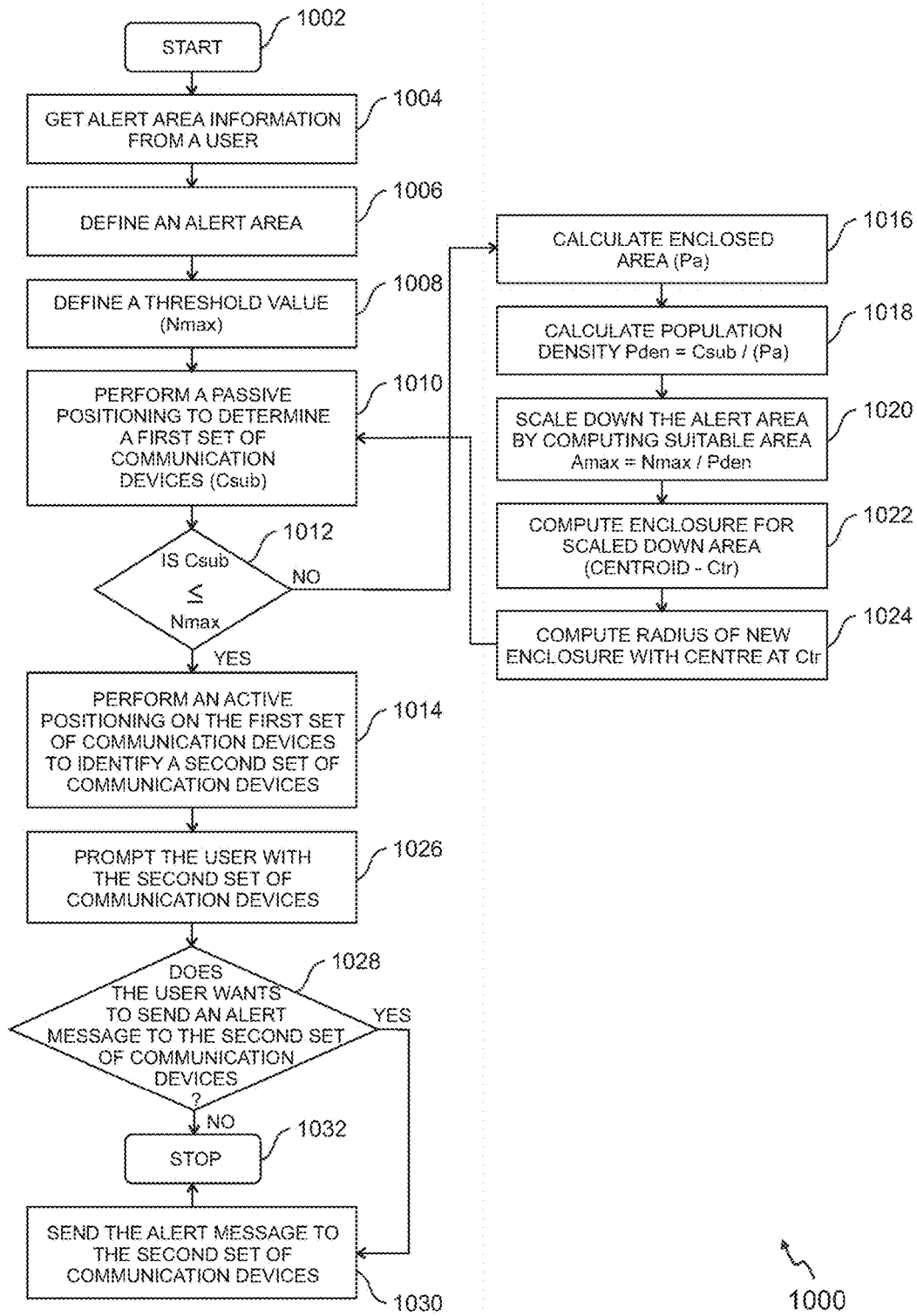
FIG. 10 illustrates a flow diagram depicting a method for sending an alert message, in accordance with another example embodiment.

FIG. 10 illustrates a flow diagram depicting a method 1000 for sending an alert message, in accordance with another example embodiment. At step 1002, the method 1000 is initiated. At step 1004, information associated with an alert area is received from a user. Example of information associated with the alert area include, but are not limited to, geo-coordinates associated with the alert area, location name, zip code, area name of the alert area. In an example embodiment, the alert area is associated with an emergency situation within a geographical area and identified automatically in the communication network using sensors, or predefined criteria like network congestion and the like. An alert application, for example the alert application 502 explained with reference to FIG. 5, is configured to input the alert information. An example of the alert information is Geographical Information System (GIS) application. At step 1006, the alert area is defined. For example, the alert area is defined on a map. Thereafter, one or more cells overlapping the defined alert area are identified by querying a cell inventory, for example the cell inventory 508 explained with reference to FIG. 5.

At step 1008, a threshold value ($N_{max}$) is defined. The threshold value is defined using one or more communication network factors. The communication network factors include, but are not limited to, a communication network throughput, an average number of broadcast messages a communication network can handle, a communication network load at a given time, a user defined number, available communication network resources, a number of communication devices reachable within a predefined time interval, and a number of communication devices that are polled at a predefined time interval. For example, if the communication network is capable of sending alert message to 50,000 communication devices at a given time, then the threshold ($N_{max}$) value may be set to 50,000.

At step 1010, a passive positioning is performed to determine a first set of communication devices. For the purpose of this description, the count of communication devices in the first set of communication devices is referred as $C_{sub}$. The passive positioning identifies all the communication devices associated with the identified one or more cells using location database, for example the location DB 510 explained with reference to FIG. 5. At step 1012, a comparison is done between $N_{max}$ and $C_{sub}$ to identify which is smaller. For example it is checked if, $$C_{sub} <= N_{max};$$

Hence, if the count of communication devices in the first set of communication devices ($C_{sub}$) is found to be less than or equal to the threshold value ($N_{max}$) then step 1014 is performed otherwise step 1016 is performed. At step 1016 an enclosed area ($P_a$) is calculated, if the first set of communication devices is found to be greater than the threshold value ($N_{max}$). Thus a numerical value of an area enclosed by the alert area is calculated. For example, 'x' square miles (where 'x' represents a numerical value).

At step 1018, a population density within the alert area is calculated based on the count of communication devices in the first set of communication devices ($C_{sub}$) and the enclosed area ($P_a$) covered by the one or more cells. For the purpose of this description, the population density is referred as $P_{den}$. In an embodiment, the population density is determined using the following formula:

$$P_{den} = C_{sub}/P_a;$$

At step 1020, the alert area is scaled down by computing suitable area ($A_{max}$) using the threshold value and the population density calculated above. In an embodiment, the scaled down area is defined using a following formula:

$$A_{max}=N_{max}/P_{den};$$

At step 1022, enclosure for scaled down area is computed, for example a centroid for the scaled down area is computed and is referred as 'Ctr'. At step 1024, a radius of new enclosure with center at Ctr is computed using the scaled down area and Pi ($\pi$) value. In an embodiment, the mathematical formula is given below $$Rad=Sqrt(A_{max}/Pi`\pi`);$$

Hence, after calculating the new radius (Rad) for the scaled down area, the scaled down area is defined as a new alert area and then the step 1010 is again performed. In an embodiment, all the steps to scale down the alert area are done by the processor 802 explained with reference to FIG. 8.

At step 1014, an active positioning is performed on the first set of communication devices to identify a second set of communication devices. The step 1014 is performed if at step 1012, the first set of communication device is less than the threshold value. The active positioning is performed to identify the users under the alert area. The active positioning is performed using communication network components GMLC and SMLC explained in detail in conjunction with FIG. 6. In an embodiment, the active positioning is performed using a triangulation method and/or a timing advance method. At step 1026, the user is prompted with the second set of communication devices and the modified alert area. In an embodiment, the user is prompted to verify, approve or crosscheck the second set of communication devices. This is done as the number of communication devices in the one or more cells are pruned to include only the communication devices that are associated with the alert area.

At step 1028, the method 1000 checks if the user wants to send alert message to the second set of communication devices. A step 1030 is performed, if the user confirm and agree to sending the alert message to the second set of communication devices otherwise a step 1032 is performed. At step 1030 the alert message is sent to the second set of communication devices. At step 1032, the method 1000 is terminated.

Without in any way limiting the scope, interpretation, or application of the claims appearing below, a technical effect of one or more of the example embodiments disclosed herein is to provide a method and a system to send alert messages in a communication network. The method sends alert messages only to users who are under an alert area thus making the broadcast alerting more accurate. The method also allows an alert system to automatically modify the alert area to a new defined area based on a throughput of a communication network, network congestion or resources available. Thereby making the alert system more efficient for broadcasting alert messages. The method further reduces the chances of message delivery failure due to network congestion as the area is modified for sending the alert message.

The present disclosure is described above with reference to block diagrams and flowchart illustrations of method and device embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a system described and depicted in FIG. 8. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

What is claimed is:

1. A method of sending alert messages in a communication network, the method comprising:
    defining an alert area associated with an alert event;
    identifying one or more cells at least partially overlapping with the alert area;
    performing a passive positioning to determine a first set of communication devices associated with the one or more cells;
    performing an active positioning on the first set of communication devices to identify a second set of communication devices present within the alert area; and
    sending an alert message to the second set of communication devices;
    wherein prior to performing the active positioning, when the first set of communication devices is greater than a threshold value of communication devices, the alert area is scaled down comprising
    determining a population density within the alert area based on a count of communication devices in the first set of communication devices and an enclosed area covered by the one or more cells; and scaling down the alert area based on the threshold value and the population density.

2. The method of claim 1, wherein identifying the one or more cells comprises:
querying a database to determine cells overlapping with the alert area, wherein the database includes at least one of an inventory of cells within the communication network, location of the cells and cellular coverage associated with each of the cells.

3. The method of claim 1, wherein the alert area is obtained by dividing the threshold value with the population density.

4. The method of claim 1, further comprising determining the threshold value of communication devices based on at least one of a communication network throughput, a communication network load, a user defined number, a number of communication devices reachable within a predefined time interval and a number of communication devices that are polled at a predefined time interval.

5. The method of claim 1, wherein the passive positioning comprises procuring a list of communication devices associated with the one or more cells from a location database, wherein the location database includes information about each communication device and their associated one or more cells.

6. The method of claim 1, wherein performing the active positioning comprises applying a triangulation method on communication devices to identify location of the communication devices.

7. The method of claim 1, wherein performing the active positioning comprises applying a forward link timing method to identify location of communication devices.

8. An alert system for sending alert messages in a communication network, the alert system comprising:
a memory to store instructions for sending the alert messages; and
a processor electronically coupled with the memory, the processor configured to execute the instructions stored in the memory to cause the alert system to at least:
define an alert area associated with an alert event;
identify one or more cells at least partially overlapping with the alert area;
perform a passive positioning to determine a first set of communication devices associated with the one or more cells;
perform an active positioning on the first set of communication devices to identify a second set of communication devices present within the alert area; and
send an alert message to the second set of communication devices;
wherein prior to perform the active positioning, when the first set of communication devices is greater than a threshold value of communication devices, the alert area is scaled down comprising
determine a population density within the alert area based on a count of communication devices in the first set of communication devices and an enclosed area covered by the one or more cells; and
scale down the alert area based on the threshold value and the population density.

9. The alert system of claim 8, wherein the processor is further configured to cause to alert system to query a database to determine cells overlapping with the alert area, wherein the database includes at least one of an inventory of cells within the communication network, location of the cells and cellular coverage associated with each of the cells.

10. The alert system of claim 8, wherein the processor is further configured to cause the alert system to divide the threshold value with the population density.

11. The alert system of claim 8, wherein the processor is further configured to cause the alert system to determine the threshold value of communication devices based on at least one of a communication network throughput, a communication network load, a user defined number, a number of communication devices reachable within a predefined time interval and a number of communication devices that are polled at a predefined time interval.

12. The alert system of claim 8, wherein the processor is further configured to cause the alert system to procure a list of communication devices associated with the one or more cells from a location database, wherein the location database includes information about each communication device and their associated one or more cells.

13. The alert system of claim 8, wherein for performing the active positioning the processor is further configured to cause the alert system to apply a triangulation method on communication devices to identify location of the communication devices.

14. The alert system of claim 8, wherein for performing the active positioning the processor is further configured to cause the alert system to apply a forward link timing method to identify the location of communication devices.

15. A non-transitory, computer-readable storage medium storing computer-executable program instructions to implement a method of sending alert messages in a communication network, the method comprising:
defining an alert area associated with an alert event;
identifying one or more cells at least partially overlapping with the alert area;
performing a passive positioning to determine a first set of communication devices associated with the one or more cells;
performing an active positioning on the first set of communication devices to identify a second set of communication devices present within the alert area; and
sending an alert message to the second set of communication devices;
wherein prior to performing the active positioning, when the first set of communication devices is greater than a threshold value of communication devices, the alert area is scaled down comprising
determining a population density within the alert area based on a count of communication devices in the first set of communication devices and an enclosed area covered by the one or more cells; and
scaling down the alert area based on the threshold value and the population density.

16. The medium of claim 15, wherein identifying the one or more cells comprises:
querying a database to determine cells overlapping with the alert area, wherein the database includes at least one of an inventory of cells within the communication network, location of the cells and cellular coverage associated with each of the cells.

17. The medium of claim 15, wherein the alert area is obtained by dividing the threshold value with the population density.

* * * * *